US011091326B2

(12) United States Patent
Seifert et al.

(10) Patent No.: US 11,091,326 B2
(45) Date of Patent: Aug. 17, 2021

(54) CONVEYING APPARATUS

(71) Applicant: SMITHS DETECTION GERMANY GMBH, Wiesbaden (DE)

(72) Inventors: Alexandra Seifert, Hüngstetten (DE); Andreas Busch, Wiesbaden (DE)

(73) Assignee: Smiths Detection Germany GmbH, Wiesbaden (DE)

(*) Notice: Subject to any disclaimer, the term of this patent is extended or adjusted under 35 U.S.C. 154(b) by 0 days.

(21) Appl. No.: 16/618,282

(22) PCT Filed: May 25, 2018

(86) PCT No.: PCT/EP2018/063846
§ 371 (c)(1),
(2) Date: Nov. 29, 2019

(87) PCT Pub. No.: WO2018/219831
PCT Pub. Date: Dec. 6, 2018

(65) Prior Publication Data
US 2020/0148483 A1  May 14, 2020

(30) Foreign Application Priority Data

May 31, 2017  (DE) ..................... 10 2017 111 995.7

(51) Int. Cl.
*B65G 47/68*  (2006.01)
*B64F 1/36*  (2017.01)
(Continued)

(52) U.S. Cl.
CPC ............ *B65G 47/681* (2013.01); *B64F 1/368* (2013.01); *B65G 43/08* (2013.01); *B65G 43/10* (2013.01);
(Continued)

(58) Field of Classification Search
CPC . B64F 1/36; B64F 1/368; B65G 37/00; B65G 47/68; B65G 47/681; B65G 43/08; B65G 43/10; B65G 47/46
(Continued)

(56) References Cited

U.S. PATENT DOCUMENTS 4,227,607 A  10/1980  Malavenda
4,429,781 A  2/1984  Holzhaeuser
(Continued)

FOREIGN PATENT DOCUMENTS

DE  2909292 A1  9/1980
DE  10031025 C1  3/2002
(Continued)

OTHER PUBLICATIONS

German language International Search Report and Written Opinion, dated Aug. 21, 2018, for International application No. PCT/EP2018/063846 (14 pgs.).
(Continued)

*Primary Examiner* — James R Bidwell
(74) *Attorney, Agent, or Firm* — Armstrong Teasdale LLP (57) ABSTRACT

A luggage conveyor device for efficiently supplying a plurality of inspection objects to be inspected or individual items in general to an inspection device (4) is provided. The conveyor device (1, 2, 3) is particularly efficiently designed such that an inspection object inspection is carried out quickly and smoothly. A correspondingly designed method for operating the conveyor device (1, 2, 3), and to a computer program product including control commands for implementing the method or operating the conveyor device (1, 2, 3) are also provided.

17 Claims, 4 Drawing Sheets

(51) Int. Cl.
  *B65G 43/08*      (2006.01)
  *B65G 43/10*      (2006.01)
  *B65G 47/46*      (2006.01)

(52) U.S. Cl.
  CPC ...... *B65G 47/46* (2013.01); *B65G 2201/0258* (2013.01); *B65G 2201/0264* (2013.01); *B65G 2203/0208* (2013.01)

(58) Field of Classification Search
  USPC .......................... 198/357, 358, 347.4, 370.01
  See application file for complete search history.

(56) References Cited

U.S. PATENT DOCUMENTS

| | | |
|---|---|---|
| 6,431,344 B1 | 8/2002 | Emmermann et al. |
| 7,686,154 B2 | 3/2010 | Henkel et al. |
| 8,474,595 B2 * | 7/2013 | Crass ................. B65G 37/00 198/358 |
| 8,886,356 B2 | 11/2014 | Magato et al. |
| 10,336,555 B1 * | 7/2019 | Kurdi ................. B64F 1/368 |
| 10,353,108 B2 * | 7/2019 | Huang ................. G01N 23/083 |
| 2003/0128806 A1 * | 7/2003 | Morrell ................. B64F 1/368 378/57 |
| 2010/0076796 A1 | 3/2010 | Klein et al. |
| 2013/0126303 A1 | 5/2013 | Crass et al. |

FOREIGN PATENT DOCUMENTS

| | | |
|---|---|---|
| DE | 102006036108 A1 | 11/2007 |
| DE | 102006006208 B4 | 11/2010 |
| DE | 102010026940 A1 | 1/2012 |
| EP | 0130810 A1 | 1/1985 |
| EP | 2168873 A2 | 3/2010 |
| WO | 0229744 A1 | 4/2002 |
| WO | 2005016755 A2 | 2/2005 |

OTHER PUBLICATIONS

German language search report, dated Jan. 30, 2018, for DE 102017111995.7 (12 pgs.).

* cited by examiner

CONVEYING APPARATUS

CROSS REFERENCE TO RELATED APPLICATIONS

This patent application is a National Stage Entry of PCT/EP2018/063846 filed on May 25, 2018, which claims priority to DE Application No. 10 2017 111 995.7 filed on May 31, 2017, the disclosures of which are hereby incorporated by reference herein in their entirety as part of the present application.

FIELD OF DISCLOSURE

The present disclosure concerns a conveying apparatus for efficiently feeding a plurality of objects to be inspected, such as baggage or general cargo, to an inspection device. The disclosure aims to improve the efficiency of the conveying apparatus so that an inspection of an object to be inspected can be carried out quickly and smoothly. The present disclosure is also directed towards an appropriately established method of operating the proposed conveying apparatus and towards a computer program product having control commands adapted to execute the method or to operate the conveying apparatus.

BACKGROUND OF DISCLOSURE

WO 02/29744 A shows devices for the detection of passengers at airports, whereby after the detection of passenger and luggage, these are tracked on the way to the aircraft or exit by means of a computer system and, if necessary, an alarm is triggered if the passenger leaves a predetermined area or is a wanted person or wants to send his luggage unaccompanied.

EP 2 168 873 A2 shows a system for a passenger carrying baggage. The passenger will usually check in at a check-in counter at an airport of departure and pick up the baggage at a conveyor belt at an airport of arrival at the end of the flight.

Security checks of persons accessing certain infrastructures, such as the departure area of airports or buildings with higher security requirements (e.g. courts, prisons, diamond mines, etc.), or at major events (e.g. concerts, sports events, etc.) are known. Persons pass through a transition area (often called a checkpoint or inspection location), where they and any hand luggage are checked, for example for dangerous or prohibited objects or substances that are concealed under clothing or on or in the body. For further details of known measures, reference is made to DE 10 2006 036 108 A1, for example.

Usually, hand luggage, jackets, shoes and other items carried by the passenger are inspected separately for personal check by means of X-ray inspection. Objects and substances inside hand luggage, for example, are made visible so that hand luggage (as an object of inspection) can be inspected non-destructively for concealed or hidden dangerous contents such as weapons, prohibited objects or dangerous substances.

In the case of known security checkpoints, it is particularly necessary that not only the technical devices themselves work efficiently, but that the technical devices are configured in such a way that passengers are also able to have their baggage checked as efficiently as possible. Technical considerations are necessary to ensure that a large number of passengers are given the opportunity to drop several pieces of baggage and, if necessary, to participate efficiently in the inspection of baggage during a follow-up inspection.

Here, it is urgently necessary that technical considerations be geared precisely to the inspection of baggage, since, for example, a conveyor belt in a warehouse is subject to very different restrictions and, in particular, human behavior typically plays no role here. For example, conveyor devices are generally known, but they cannot be reused without restrictions in the security screening of persons or baggage.

The known checkpoints represent a bottleneck with regard to baggage throughput and passenger throughput, as follow-up inspections always require more time than automatic inspection by the inspection devices.

SUMMARY OF THE PRESENT DISCLOSURE

The present disclosure provides a conveying apparatus which aims to enable a plurality of objects to be inspected, such as baggage, to pass efficiently through a security check, such as an inspection device, and in particular that the plurality of objects to be inspected can be smoothly conveyed to the inspection device. The present disclosure also proposes a method for operating the proposed conveying apparatus. Furthermore, a computer program product is proposed, with control commands which are suitable to carry out the method and to operate the conveyor, respectively, when they are executed on a computer.

Features and details which are described in connection with the apparatus and system of the disclosure shall of course also apply in connection with the method of the disclosure and vice versa. Therefore, mutual reference is made with regard to the disclosure.

Accordingly, a conveying apparatus is provided for efficiently feeding a plurality of inspection objects to be inspected to an inspection device, including a main conveyor belt device for sequentially feeding the plurality of inspection objects to be inspected to the inspection device, wherein at least one auxiliary conveyor belt device is provided which is connected to the main conveyor belt device in such a way that further inspection objects can be introduced into the sequential feed.

The inspection device may be arranged to irradiate inspection objects non-destructively by means of electromagnetic radiation and to irradiate them thereby in order to obtain, based on the radiation not absorbed by the inspection object, information about the interior of the inspection object, for example in the form of transmission images, which make it possible to find target objects or target substances in the inspection object. An inspection device may be, for example, an X-ray inspection device.

According to the present disclosure, an inspection object to be inspected refers to any piece goods. This can be any type of portable cargo, such as parcels, mail bags, and so on. It can also be a piece of baggage that is typically carried by passengers in their hand luggage. It can also be an item of clothing or baggage. Thus, an inspection object can generally be present as any object, whereby the term inspection object here refers to the fact that it is a portable object, for example of a person, in particular an object of everyday life, such as a piece of luggage. In principle, any portable object can be an inspection object, e.g. a portable computer, a camera, or an article of clothing, etc.

A majority of objects to be inspected are, for example, at airports. At a checkpoint, a large number of passengers usually place their baggage (as inspection objects) on a conveyor belt. The baggage is then fed from the conveyor belt to an inspection device, which is set up for the non-destructive inspection of the contents of the objects that are not visible from the outside by means of x-rays and passes through them. Such screening can be implemented according to conventional procedures and can, for example, use an X-ray inspection device, also known as an (X-ray) scanner. The skilled in the art already knows a large number of scanners for such an inspection. However, it cannot be ruled out that the inspection nevertheless requires human intervention, for example, if corresponding objects cannot be analyzed using image processing procedures. For this purpose, it is possible that the inspection device or an operator of the inspection device consults a human employee who then carries out a manual inspection of the inspection object in order to determine a final inspection result; this can also include repeated or repeated screening with the inspection device.

An efficient supply is when a large number of passengers make their inspection objects available as parallel as possible in such a way that a sequential stream of inspection objects is created which is fed to the inspection device. Ideally, this should result in a flow of inspection objects that is as continuous as possible, so that the inspection device is used to its full advantage. Such a flow of inspection objects, ideally as constant as possible, does not exist if there are gaps between inspection objects. Such gaps between inspection objects cause the corresponding conveyor belt to run through the inspection device partially empty, i.e. without inspection objects. According to the disclosure, this is overcome by the fact that further conveyor belt devices are provided.

The main conveyor belt device can be configured according to a conventional conveyor belt which runs through an inspection device known per se and can be stopped or moved automatically or manually. Thus, the main conveyor belt device feeds inspection objects to the inspection device and guides them out of the inspection device after the inspection has been completed. When inspecting the inspection object in the inspection device, the inspection object can be stopped or moved in the opposite direction by automatically or manually controlling the conveyor belt as required.

Sequential feeding of the majority of inspection objects to be inspected ensures that the inspection objects are fed into the inspection device along the main conveyor belt device, although this does not prevent the inspection objects from being grouped, i.e. grouped, for example by means of pick-up devices, such as trays.

In the context of the present disclosure, a sequential feeding of inspection objects should also exist if several inspection objects come to rest orthogonally to the transport direction in a tray. Here the sequential feeding is based on the fact that also several trays in a row pass through the inspection device. Thus, the sequential feeding is considered to have taken place if a number of inspection objects to be inspected pass through the inspection device linearly or essentially linearly.

According to the disclosure, it was surprisingly recognized that it is not the technical devices themselves that delay the processing of the objects to be inspected, but rather the lack of technical means that allow the passengers to efficiently provide the objects to be inspected. Surprisingly, the sequential supply of inspection objects to the inspection device was also found to typically have gaps leading to a delay in inspection.

This disadvantage is overcome, according to the disclosure, by proposing at least one auxiliary conveyor belt device which leads into the main conveyor belt device. In this way it is possible to feed further inspection objects to the main conveyor in such a way that a continuous flow of inspection objects is created. The auxiliary conveyor belt device is connected to the main conveyor belt device in such a way that further inspection objects can be introduced into the sequential feed. Thus, it is possible for the passengers to place inspection objects directly on the main conveyor belt or to use the auxiliary conveyor belt device, which then aligns the provided inspection objects into the sequential feed by the main conveyor belt device.

For example, additional sensors may be used which are set up to detect that a gap occurs on the main conveyor belt device and that inspection objects from the auxiliary conveyor belt device can be sorted in accordingly. These can be, for example, optical or imaging sensors located above the proposed conveyor belt device and/or fixed capacitive or inductive proximity sensors below the conveyor belt device. This sensor system can monitor the sequential feeding of the inspection objects and insert further inspection objects of further auxiliary conveyor belt devices into the mainstream. This ensures that the inspection objects are typically fed to the inspection device without any gaps, even when there is a high passenger volume.

Here it is possible to prioritize either the main conveyor belt or one of the auxiliary conveyor belt devices in such a way that inspection objects of one of these devices can be treated preferentially. For passengers, for example, it is possible to read from their boarding pass when departure is scheduled. Depending on such a time specification, the respective inspection object or the corresponding conveyor belt device can be prioritized or delayed. In this way, some late passengers receive their baggage faster at the hand baggage check than passengers who arrived early.

The disclosure also overcomes the disadvantage that a particularly long conveyor belt creates various gaps. For example, it is known that the possibilities for passengers to place objects for inspection are increased by providing an especially long conveyor belt which, for example, forms a semicircle in such a way that passengers can place objects for inspection along the semicircular conveyor belt. However, since only the length of the conveyor belt is maximized, gaps in the sequential flow of inspection objects occur again with low passenger volumes, which must be avoided.

According to the disclosure, it is possible to connect at least one of the auxiliary conveyor belt devices exactly when the passenger volume increases. If the passenger volume decreases again, the connected auxiliary conveyor belt device can be deactivated again. One aspect of the present disclosure is that the proposed conveyor belt device can be scaled according to a current passenger volume in such a way that further auxiliary conveyor belt devices can be added or deactivated accordingly.

In the case of a conveyor belt device of the present disclosure, the focus is on the fact that there is an elongated transport device, which is typically implemented by means of a conveyor belt. Here, however, a conveyor belt device is to be understood in such a way that only a long transport distance has to be mastered. Thus, a synonym for conveyor belt device in the context of the present disclosure is, for example, a transport device. For example, it is known that a conveyor belt is not implemented by means of a one-piece belt, but that such a conveyor belt can also be provided by means of individual segments or slats. Thus, a conveyor belt device is described figuratively and, according to the disclosure, includes any transport device that is suitable for sequentially feeding inspection objects, in particular pieces of luggage and/or freight, to an inspection device.

According to one aspect of the present disclosure, at least two auxiliary conveyor belt devices can be provided, which are arranged offset with respect to the main conveyor belt device in such a way that they introduce the respective further inspection objects at different sections of the main conveyor belt device. This has the advantage that several auxiliary conveyor belt devices can be provided, which classify further inspection objects at different places in the flow of the inspection objects. In particular, however, it is possible that different inspection objects can be fed to a main conveyor belt device simultaneously at several sections. This is possible from both sides of the main conveyor belt device, so that gaps are avoided in the continuous flow of inspection objects. According to the disclosure, these gaps are filled particularly efficiently.

According to a further aspect of the present disclosure, the main conveyor belt device and at least one auxiliary conveyor belt device can be arranged at a distance from each other in such a way that they are at least partially accessible from at least two sides for at least one passenger each. This has the advantage that the respective conveyor belt devices are not arranged adjacent to each other, but that the conveyor belt devices are spaced in such a way that a large number of passengers can access the different conveyor belt devices at the same time. This ensures that passengers have access to the conveyor belt device in such a way that they can, for example, place inspection objects on it from both sides of the conveyor belt device. Thus, it is possible to occupy all conveyor belt devices at the same time. The conveyor belt devices can also be configured in such a way that they are accessible from three sides. The two long sides of the conveyor belt device can be used for this purpose, as can the head end of a conveyor belt device. A conveyor belt device can be configured in such a way that the conveyor belt or the individual segments run concealed away from the inspection device and run along the surface in the direction of the inspection device. This results in an accessible head end that the passengers can use to store the inspection objects.

According to a further aspect of the present disclosure, the main conveyor belt device and at least one auxiliary conveyor belt device can each be independently variable in their conveying speed. The speed refers in particular to the transport speed at which the inspection objects can be moved. For example, it is possible that the main conveyor belt or the main conveyor belt device is operated faster than an auxiliary conveyor belt device. This in turn makes it possible to take passenger volume into account.

According to a further aspect of the present disclosure, the main conveyor belt device and the at least one auxiliary conveyor belt device are each variable in their transport speed in such a way that a sequence of inspection objects to be inspected is created on the main conveyor belt device as continuously as possible. This has the advantage that the auxiliary conveyor belt devices can be operated slower or faster, depending on whether there is a gap in between the inspection objects on the main conveyor belt device. For example, if a gap is detected on the main conveyor belt device, an auxiliary conveyor belt device can be accelerated so that the inspection object is quickly transported to that gap. If, on the other hand, no gap is detected on the main conveyor belt device, the corresponding auxiliary conveyor belt device can be slowed down to such an extent that the object being inspected waits for a gap in the main conveyor belt device. This allows a continuous sequence of inspection objects to be inspected to be generated in a particularly efficient manner. Several auxiliary conveyor belt devices can also be operated at different specific speeds, for example to enable the above-mentioned prioritization of certain inspection objects.

According to another aspect of the present disclosure, inspection objects to be inspected are grouped together by means of trays and a tray return device moves the trays essentially in the opposite transport direction to the main conveyor belt device. This has the advantage that, in general, groups of inspection objects can also be regarded as inspection objects, which are grouped together by means of pockets or trays, for example. An automatic tray return device is provided which, contrary to known methods, moves the trays away from the main conveyor belt device. This can be done in such a way that either empty trays are transported back to the passengers or trays which contain inspection objects which have been inspected with negative results are fed to an inspection personnel. According to the present disclosure, an essentially opposite transport direction is an opposite transport direction (feedback device), whereby the skilled person recognizes that small deviations are possible. Thus, the feature "essentially" is generally optional in the context of the present disclosure. For example, the transport direction can also be at an acute angle to the transport direction of the main conveyor belt device.

According to a further aspect of the present disclosure, a separate tray return device can be provided for each conveyor belt device. This has the advantage that separate tray return devices are provided both for the main conveyor belt device and for the at least one auxiliary conveyor belt device. Thus, the passengers have the possibility not only to place their inspection objects on the corresponding conveyor belt device, but also to receive the trays, which are typically prescribed to be able to transport individual inspection objects in a manageable way.

According to another aspect of the present disclosure, an inspection object diversion device can be connected or coupled to the inspection device, which is set up to divert inspection objects from the main conveyor belt device in the event of a negative (or not clearly positive) inspection result. This has the advantage that if the inspection result is negative, the inspection objects can be removed from the main conveyor in such a way that they are no longer accessible to the passenger. Thus, a negatively inspected inspection object is not issued to the passenger, but rather is automatically diverted and prevented from being accessed by the passenger. A negative inspection result exists if an object to be inspected has a potential hazard or at least cannot be inspected. This also ensures that inspection objects with a negative or unclear (not clearly positive) inspection result do not lead to a jam on the main conveyor belt.

According to another aspect of the present disclosure, a return conveyor belt device can be coupled to the inspection object diversion device as a return device for the diversion. This has the advantage that the respective inspection object is moved further away from the passenger and moved to a position where it can be inspected further, for example manually. This can be done by providing a return conveyor parallel to the main conveyor in the opposite direction.

According to another aspect of the present disclosure, the return conveyor may be arranged to return objects of inspection in the opposite direction to that of the main conveyor to the inspection device for re-inspection. This has the advantage that negative or unambiguously positive inspected objects can either be fed to security personnel or a new machine inspection is carried out in the inspection device.

This can be done, for example, if a clear inspection of the inspection object was not possible, for example due to overlapping of two inspection objects.

Another aspect of the present disclosure is that the return conveyor can include an output point for the manual inspection of inspection objects. This has the advantage that there is a possibility of stopping the negatively inspected inspection objects so that security personnel can inspect the inspection object manually or so that the inspection object can be presented to the passenger.

Another aspect of the present disclosure is that the inspection device can include several inspection units, each of which is set up to inspect at least one inspection object. The advantage of this is that the continuous flow of inspection objects can actually be inspected by several inspection units in such a way that there is no delay. For example, a single shielded channel may be provided that includes multiple inspection units. For example, three inspection objects can be introduced into a control channel, with three inspection units scanning one inspection object each. This makes it possible to inspect several inspection objects at the same time for a single inspection device. In the context of the present disclosure, this is particularly advantageous because the inspection device is fed by several conveyor belt devices.

According to another aspect of the disclosure, the inspection devices and, if necessary, the inspection units can be controlled remotely, whereby a positive or negative inspection result is transmitted remotely for each inspection object. This has the advantage that the individual inspection devices or inspection units can be communicatively linked to one or more work centers. For example, the control units can be network-connected with computers of inspection personnel, who can then inspect the inspection objects or images from the inspection objects remotely by means of inspection. It is also possible for the remote-control personnel to transmit an inspection result from a central office, which is then implemented by the corresponding inspection object diversion device. If, for example, a negative or not clearly positive inspection result is present, the inspection object diversion device can be addressed remotely, and the corresponding inspection object can be fed to inspection personnel on site by means of the return conveyor belt device. Thus, it is possible to inspect several inspection units from one central location. It is also possible, alternatively or additionally, that if inspection personnel have doubts about a potential hazard, a corresponding image of a central unit can be presented, which then transmits the inspection result and controls the conveyor accordingly.

The object is also solved by a method of operating a conveying apparatus for efficiently supplying a plurality of inspection objects to be inspected to an inspection device, including main conveyor belt device arranged for sequentially supplying the plurality of inspection objects to be inspected to the inspection device, wherein at least one auxiliary conveyor belt device is operated which is connected to the main conveyor belt device in such a way that further inspection objects are introduced into the sequential supply.

The object is also solved by a computer program product with control commands which execute one of the above methods when executed on a computer or operate the proposed conveyor.

Here it is particularly advantageous that the procedure provides process steps which implement or control the structural features of the conveying apparatus. Furthermore, the conveying apparatus includes structural features which can also be implemented using the proposed procedure.

Although the above general description is exemplarily based on passenger baggage at a checkpoint, it is clear to the skilled in the art that the principles outlined above can be applied to a cargo handling system in general. There, too, cargo with varying volumes is fed in at an entry side and conveyed via conveyor systems to corresponding destinations, whereby the way there, also via at least one inspection device, leads to the inspection of the cargo. At an airport, for example, a destination can be the collection point assigned to a particular aircraft for cargo to be transferred to the cargo hold of the aircraft.

BRIEF DESCRIPTION OF THE FIGURES

Further advantages, features and details of the disclosure result from the following description, in which embodiments of the disclosure are described in detail with reference to the drawings. The features mentioned in the claims and in the description may be essential for the disclosure either individually or in any combination. Likewise, the features mentioned above, and the features further described here can each be used for themselves or for several in any combination. Similar or identical parts or components are partly provided with the same reference signs. The terms "left", "right", "top" and "bottom" used in the description of the embodiments refer to the drawings in an orientation with a normally legible figure designation or reference signs. The embodiments shown and described are not to be understood as exhaustive but are of an exemplary nature to explain the disclosure. The detailed description is for the information of the skilled person, therefore known circuits, structures and procedures are not shown or explained in detail in the description in order not to complicate the understanding of the present description.

The dimensions given in the figures are millimeters and are only intended to give a rough idea of the spatial configuration of the embodiments. The dimensions are not to be understood as restrictive and certainly not as such that a configuration with exactly these dimensions would only be possible or meaningful. It is clear to the skilled person that other aspects which are not essential here will have an influence on the respective dimensions for a concrete configuration, without, however, influencing or negating the principles proposed here.

DETAILED DESCRIPTION

The following description of embodiments is based on baggage as an example for inspection objects of passengers at a checkpoint, for example at an airport. It is possible for the skilled person to generalize the examples described and to transfer them, for example, to a cargo handling system. In a cargo handling system, for example also at an airport, cargo is fed to an entrance side according to the current volume and conveyed via conveyor systems to predetermined destinations. The route to the destination then also leads a package through at least one inspection device to inspect the package. At an airport, for example, a destination can be the collection point assigned to a particular aircraft for packages to be transported into the cargo hold of the aircraft. Thus, the efficiency problem explained in connection with hand luggage at a checkpoint for passengers also applies to a cargo handling system and is accessible in accordance with the improvements proposed here for increasing efficiency.

Figure 1:
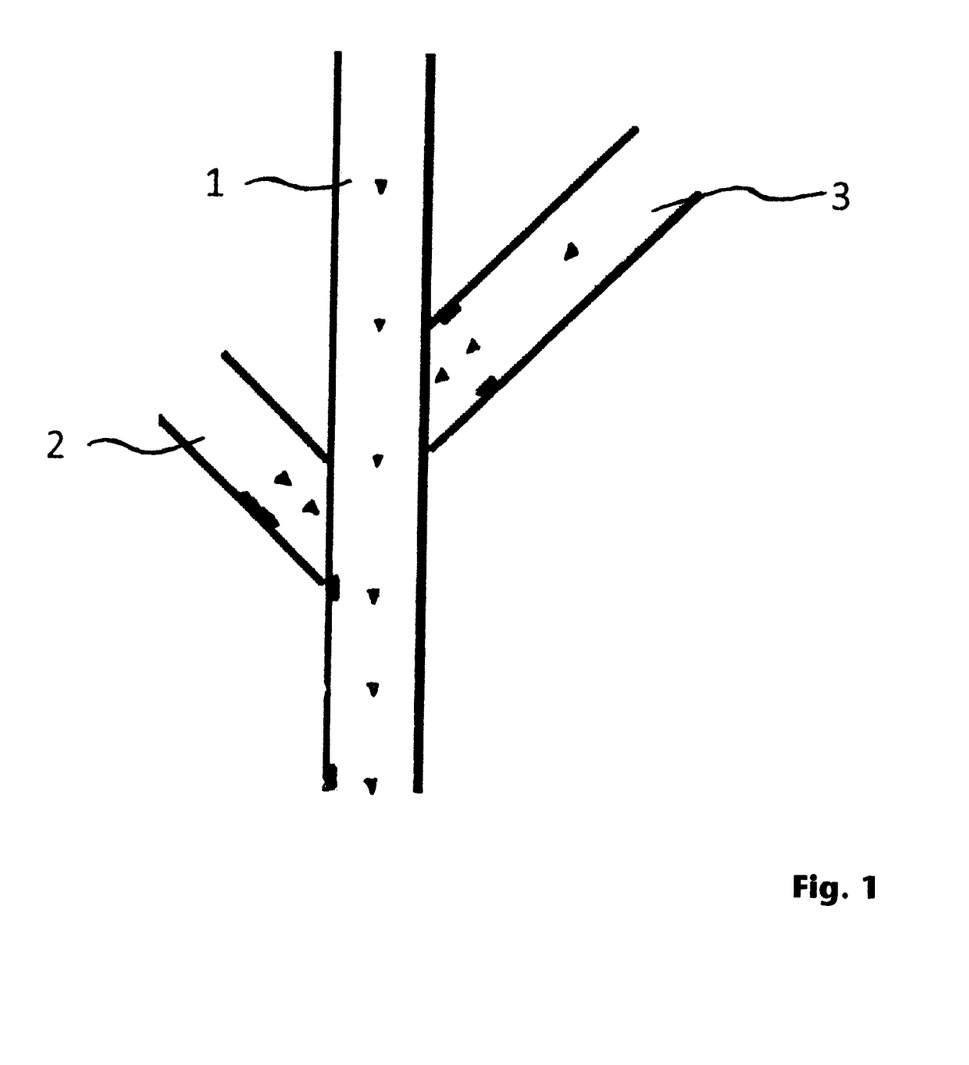
FIG. 1 shows a top view of a conveying apparatus according to one aspect of the present disclosure.

FIG. 1 shows a schematic configuration of the disclosure of feeding the majority of pieces of baggage to be inspected by means of a main conveyor belt device 1, which is arranged centrally, by means of further auxiliary conveyor belt devices 2 and 3, which are arranged offset with respect to the main conveyor belt device 1 in such a way that a continuous flow of pieces of baggage is produced. In FIG. 1, the inspection device, which is not shown in FIG. 1 (as well as in FIGS. 2 and 3), would be located below. Thus, the passengers place their inspection objects both on the main conveyor belt device 1 and on the auxiliary conveyor belt devices 2 and 3, respectively. It is also possible to deactivate at least one of the auxiliary conveyor belt devices 2 and 3.

If there is a gap in the flow of baggage on the main conveyor belt device 1, the two auxiliary conveyor belt devices 2 and 3 are configured in such a way that they take advantage of such a gap and place their own baggage in this gap in such a way that they feed the baggage to the main conveyor belt device 1 in such a way that the baggage comes to rest in the gap.

For this purpose, the transport speed of the individual belts can be varied in such a way that the gaps are filled as well as possible.

Figure 2:
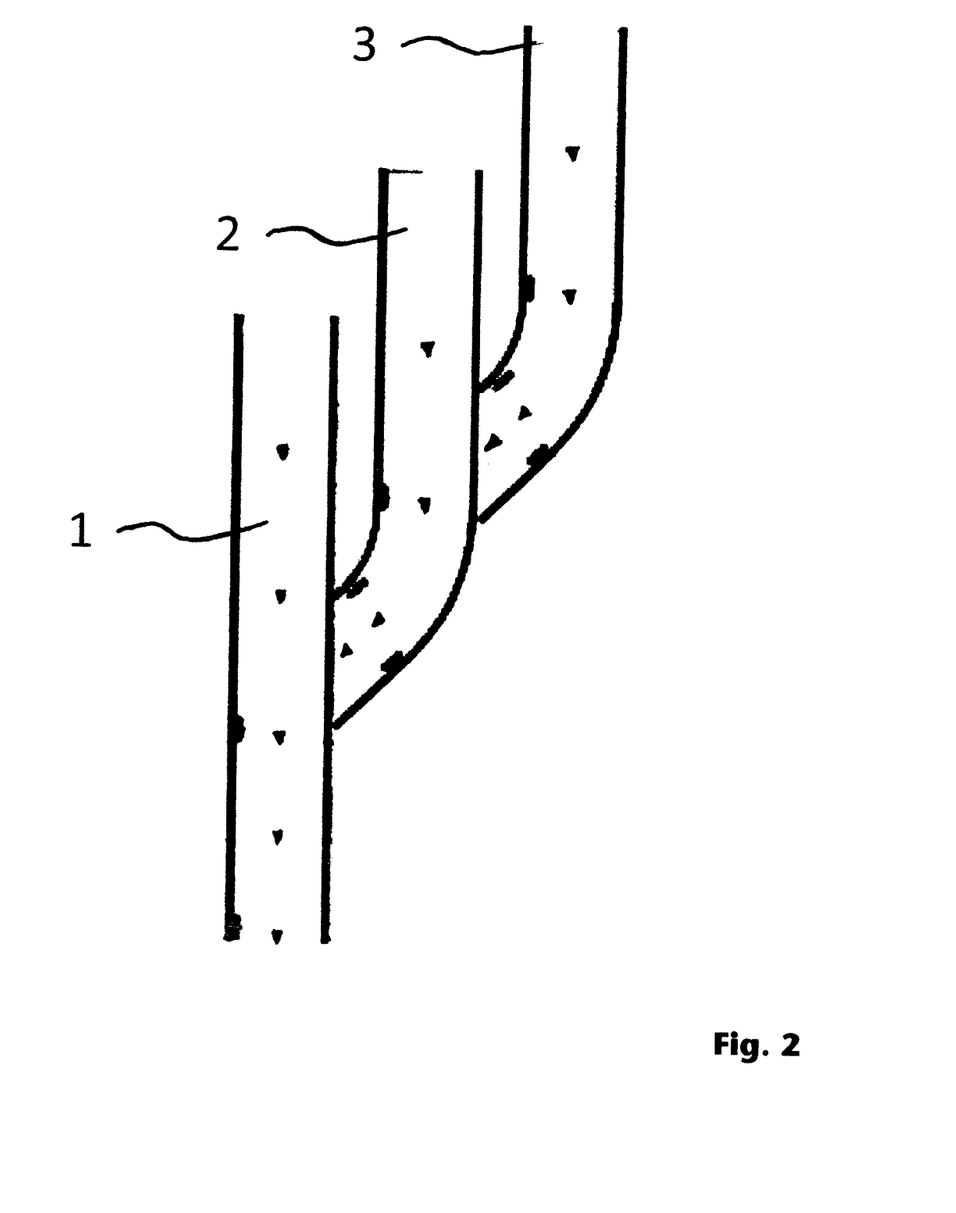
FIG. 2 shows in a plan view a further arrangement of a conveying apparatus, whereby a first auxiliary conveyor belt device leads into a second auxiliary conveyor belt device according to an aspect of the present disclosure.

FIG. 2 shows in a schematic plan view that a first auxiliary conveyor belt device 2, which discharges into the main conveyor belt device 1, can be connected to a further auxiliary conveyor belt device 3. Thus, the auxiliary conveyor belt device 3 is configured to fill gaps in the flow of baggage pieces of auxiliary conveyor belt device 2. Furthermore, the auxiliary conveyor belt device 2 shall be configured to fill gaps in the main conveyor belt device 1. In this way, any number of conveyor belts can be combined in such a way that the main conveyor belt or the main conveyor belt device 1 has as complete a flow of baggage as possible. Thus, it is possible to use an inspection device in a particularly advantageous way in accordance with the disclosure, since typically a continuous stream of inspection objects is fed into processing.

Figure 3:
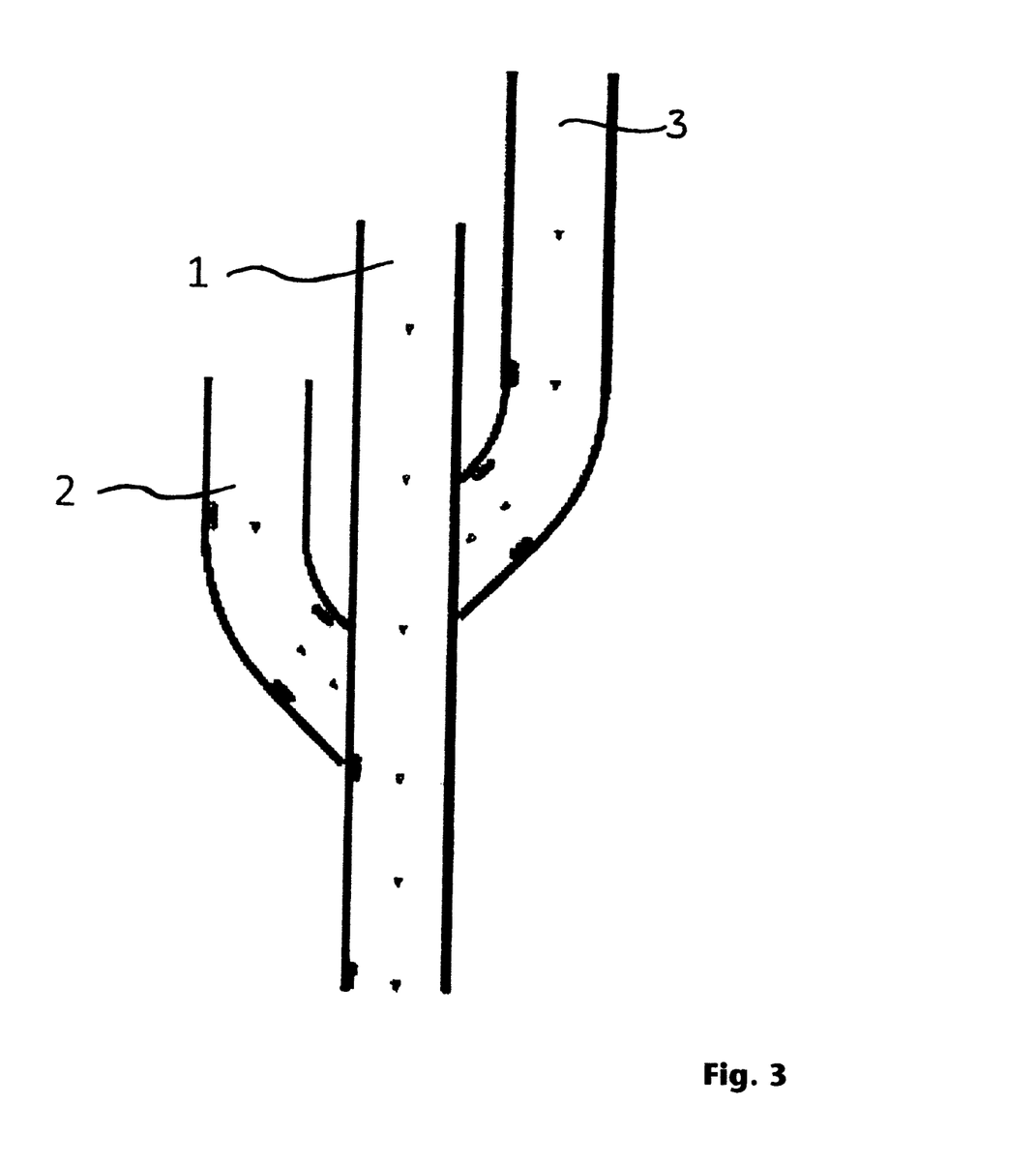
FIG. 3 shows a plan view of a further configuration of the conveying apparatus according to the disclosure.

FIG. 3 shows in a schematic plan view a further configuration of the corresponding conveyor belt device, which corresponds approximately to the configuration according to FIG. 1. As can be seen in all Figures, there is so much space between the individual conveyor belt devices that passengers can operate the conveyor belt devices from at least two sides. Altogether it is possible to combine the configurations according to FIGS. 1, 2 and 3. For example, a branching as shown in FIG. 2 can also be applied to the configuration according to FIG. 1.

Figure 4:
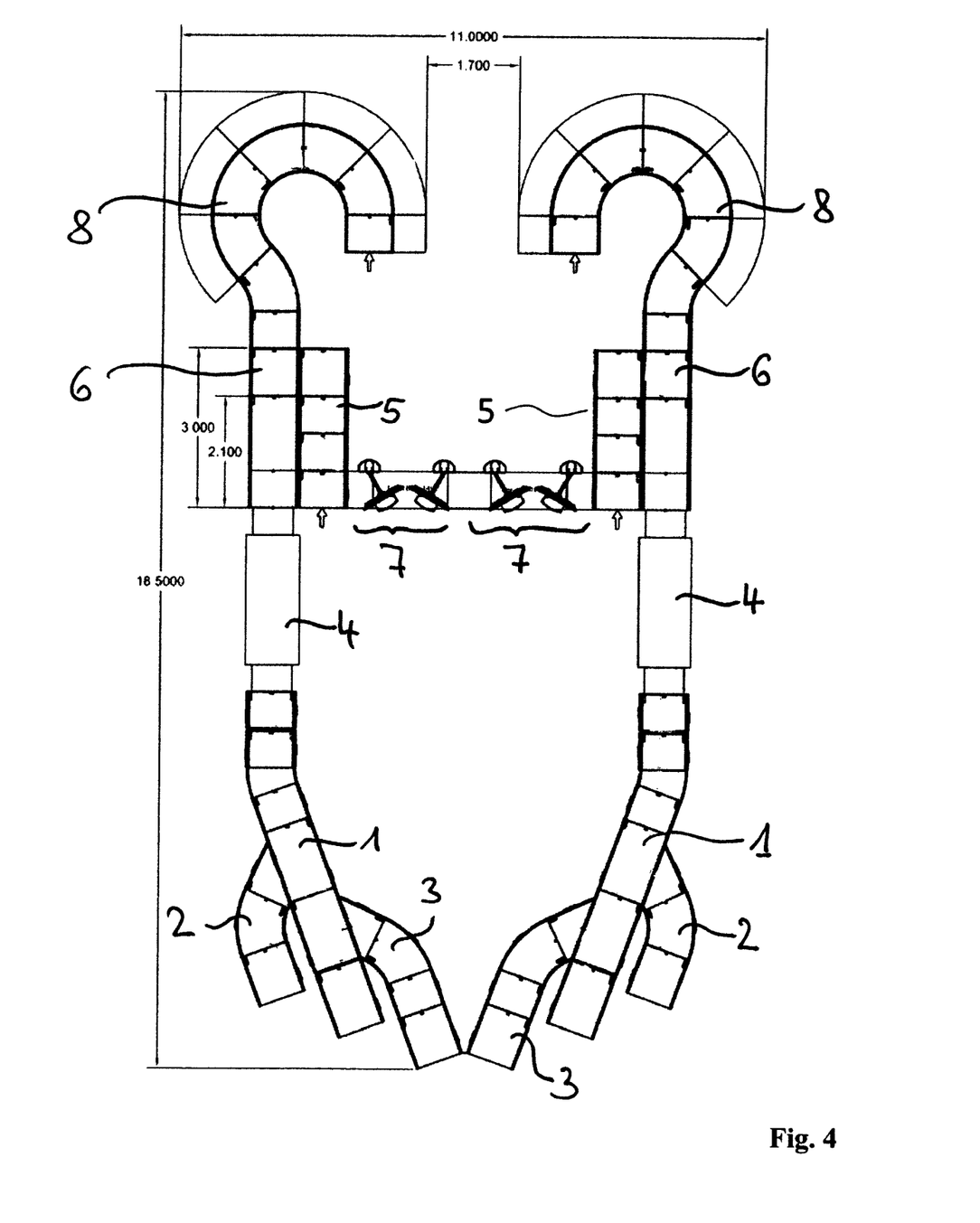
FIG. 4 shows the conveying apparatus in a plan view together with an inspection device and a return conveyor belt device according to one aspect of the present disclosure.

FIG. 4 shows the conveyor device according to the disclosure in a schematic plan view, with an inspection device 4 arranged at the top and the return conveyor belt device 5 arranged on the left side. The return conveyor belt device 5 is fed by a diverter device 6 which is arranged to take a piece of luggage which could be judged negative or not unambiguously positive by the inspection device 4 from the main conveyor belt device 1 and feed it to the return conveyor belt device 5. In the embodiment shown in FIG. 4, it is possible that passengers load, at the bottom, one of the conveyor belts 1, 2, 3 and that, after the inspection device 4, in the event of a negative inspection result, a potentially dangerous piece of baggage is moved from the main conveyor belt device 1 to the left onto the return conveyor belt device 5 by the diverter device 6 and is then moved, from top to bottom, in the direction to the front of inspection device 4. Thus, the inspection object can be manually inspected at follow-up inspection workstations 7 and/or again be fed into the inspection device 4.

In FIG. 4, no workstations are shown for the operators of the inspection devices 4 who can control or read out the inspection device 4. These operator workstations are arranged remotely and centrally at a remote location. Of course, a respective operator workstation can also be located at or in the immediate vicinity of the associated inspection device 4. In other words, the operator workstations are arranged remotely and connected to the proposed apparatuses or devices in terms of network technology.

From the operator workstations (not shown in FIG. 4) it is possible to decide whether a corresponding piece of luggage is to be inspected positively or negatively.

In FIG. 4, the configuration of the conveyor device as shown in FIG. 3 is used, with the direction of transport in FIG. 4 being from bottom to top in the opposite direction to FIGS. 1 to 3.

The upper end of the main conveyor belt device 1 is formed by a baggage reclaim device 8, the path of which in FIG. 4 is in the form of a round hook or question mark or mirrored question mark. The shape of the baggage reclaim device 8 is particularly space-efficient, as it creates a correspondingly larger access area in the outer circumferential area for the passengers who pick up their inspected baggage again. With an appropriate dimensioning for an expected passenger and thus baggage volume, a backlog of inspection objects to inspection device 4 can be avoided as far as possible.

Further, a method of operating a conveyor for efficiently feeding a plurality of pieces of baggage to be inspected to an inspection device 4 is proposed, including a main conveyor belt device 1 arranged for sequentially feeding the plurality of pieces of baggage to be inspected to the inspection device 4, wherein at least one auxiliary conveyor belt device 2, 3 is operated connected to the main conveyor belt device 1 such that further pieces of baggage are introduced into the sequential feeding. The skilled person recognizes here that further procedural steps may be necessary and in particular that individual procedural steps may be carried out iteratively.

The invention claimed is:

1. A conveying apparatus for efficiently supplying a plurality of inspection objects to be inspected by an inspection device, comprising a main conveyor belt device arranged for sequentially supplying the plurality of inspection objects to be inspected to the inspection device in a sequential feed, wherein at least one auxiliary conveyor belt device is provided, which is connected to the main conveyor belt device in such a way that further inspection objects can be introduced into the sequential feed, wherein an inspection object diversion device is coupled to the inspection device and is configured to divert inspection objects from the main conveyor belt device in the event of a negative inspection result, and wherein a return conveyor belt device is coupled to the inspection object diversion device to facilitate diverting inspection objects from the main conveyor belt.

2. A conveying apparatus according to claim 1, wherein at least two auxiliary conveyor belt devices are provided, which are arranged offset with respect to the main conveyor belt device in such a way that they introduce the respective further inspection objects at different sections of the main conveyor belt device.

3. A conveying apparatus according to claim 1, wherein the main conveyor belt device and the at least one auxiliary conveyor belt device are arranged spaced apart from one another in such a way that they are each at least partially accessible from at least two sides for a supply of inspection objects.

4. A conveying apparatus according to claim 1, wherein the main conveyor belt device and the at least one auxiliary conveyor belt device can each be varied in their transport speed independently of one another.

5. A conveying apparatus according to claim 1, wherein the main conveyor belt device and the at least one auxiliary conveyor belt device are each variable in their transport speed in such a way that on the main conveyor belt device a sequence of inspection objects to be inspected is produced which is as continuous as possible.

6. A conveying apparatus according to claim 1, wherein inspection objects to be inspected are grouped together by means of trays and a tray return device moves the trays essentially in the opposite transport direction to the main conveyor belt device.

7. A conveying apparatus according to claim 6, wherein a separate tray return device is provided for each conveyor belt device.

8. A conveying apparatus according to claim 1, wherein the return conveyor belt device moves inspection objects substantially against the transport direction of the main conveyor belt device again in front of the inspection device for a further inspection to a follow-up control location and/or for a renewed inspection by the inspection device.

9. A conveying apparatus according to claim 8, wherein the return conveyor belt device comprises an output location for the manual inspection of inspection objects.

10. A conveying apparatus according to claim 1, wherein the inspection device comprises a plurality of inspection units, each of which is configured to inspect at least one inspection object.

11. A conveying apparatus according to claim 10, wherein the inspection device and/or the inspection units can be remotely controlled and a positive or a negative inspection result can be remotely transmitted for each inspection object.

12. A method of operating a conveying apparatus for efficiently supplying a plurality of inspection objects to be inspected by an inspection device, comprising a main conveyor belt device arranged for sequentially supplying the plurality of inspection objects to be inspected to the inspection device, wherein at least one auxiliary conveyor belt device is operated which is connected to the main conveyor belt device in such a way that further inspection objects are introduced into the sequential feed, wherein the inspection objects to be inspected are grouped together by trays, and a wherein a separate tray return device for each of the main conveyor belt device and the at least one auxiliary conveyor belt device moves the trays essentially in the opposite transport direction to the main conveyor belt device.

13. A computer program product comprising control instructions which execute the method according to claim 12 when they are executed on a computer.

14. A method apparatus according to claim 12, wherein at least two auxiliary conveyor belt devices are provided, which are arranged offset with respect to the main conveyor belt device in such a way that they introduce the respective further inspection objects at different sections of the main conveyor belt device.

15. A method apparatus according to claim 12, wherein the main conveyor belt device and the at least one auxiliary conveyor belt device are arranged spaced apart from one another in such a way that they are each at least partially accessible from at least two sides for a supply of inspection objects.

16. A method apparatus according to claim 12, wherein the main conveyor belt device and the at least one auxiliary conveyor belt device can each be varied in their transport speed independently of one another.

17. A method apparatus according to claim 12, wherein the main conveyor belt device and the at least one auxiliary conveyor belt device are each variable in their transport speed in such a way that on the main conveyor belt device a sequence of inspection objects to be inspected is produced which is as continuous as possible.

* * * * *